United States Patent [19]
Eichlseder et al.

[11] Patent Number: 5,192,474
[45] Date of Patent: Mar. 9, 1993

[54] MAKING A DATA-CARRYING OPTICAL DISK

[75] Inventors: Martin Eichlseder, Tettenweis; Peter Lichtinger, Fürstenfeldbruck, both of Fed. Rep. of Germany

[73] Assignee: Krauss-Maffei Aktiengesellschaft, Munich, Fed. Rep. of Germany

[21] Appl. No.: 883,833

[22] Filed: May 15, 1992

Related U.S. Application Data

[62] Division of Ser. No. 669,357, Mar. 14, 1991, Pat. No. 5,160,751.

[30] Foreign Application Priority Data

Mar. 15, 1990 [DE] Fed. Rep. of Germany ....... 4008310

[51] Int. Cl.$^5$ .............................................. B29C 45/42
[52] U.S. Cl. ................................. 264/106; 264/328.1; 264/336; 264/342 R
[58] Field of Search ..................... 264/106, 328.1, 334, 264/336, 342 R, 345, 348, 237; 425/810, 436 R, 444, 556

[56] References Cited

U.S. PATENT DOCUMENTS

| | | | |
|---|---|---|---|
| 2,390,129 | 12/1945 | Shobert | 264/336 |
| 4,118,168 | 10/1978 | Rees et al. | 425/810 |
| 4,519,767 | 5/1985 | Westerman, Jr. | 425/810 |
| 4,618,466 | 10/1986 | McGlashen et al. | 264/336 |

*Primary Examiner*—Jill L. Heitbrink
*Attorney, Agent, or Firm*—Herbert Dubno; Andrew Wilford

[57] ABSTRACT

An optical disk having a pair of axially oppositely directed faces and an annular outer periphery is made by first forming a mold cavity corresponding to the shape of the disk between a pair of axially spaced parts and a demolding ring sandwiched between the parts. The cavity is then filled with a hardenable resin such that the parts form the respective faces and an inner periphery of the ring forms the outer periphery of the disk and the resin is at least partially hardened in the cavity. The parts are then axially oppositely separated from each other and from the disk to leave the disk in the ring with both of its faces exposed and the ring is then transversely displaced with the disk engaged in it out from between the mold parts. The disk is then cooled and shrunk such that its outer periphery separates from the inner periphery of the ring and the disk separates from the ring.

2 Claims, 2 Drawing Sheets

MAKING A DATA-CARRYING OPTICAL DISK

CROSS REFERENCE TO RELATED APPLICATION

This application is a division of copending patent application Ser. No. 07/669,357 filed Mar. 14, 1991, now U.S. Pat. No. 5,160,751 and claiming the priority of German patent application 4,008,310 filed Mar. 14, 1990.

FIELD OF THE INVENTION

The present invention relates to the manufacture of a data-carrying optical disk More particularly this invention concerns a system for taking the finished disk out of the mold it is formed and/or finished in.

BACKGROUND OF THE INVENTION

A standard optical disk is made between a pair of mold parts, one of which has a surface that embosses in the resin the disk is made from bumps that carry the disk's data. The hot resin may be cured with ultraviolet light. Once the disk is formed, the mold is opened, invariably leaving the disk stuck to the mold part having the data-forming bumps.

Stripping the disk from the mold is a fairly delicate task because the still-hot disk is extremely fragile, and also because the data-carrying formations are very minute. At the same time the disk must be handled with reasonable speed to free the mold to make another disk, as the molds are so very expensive that they cannot be left idle. Using a suction-type lifter or gripper is one proposed method that frequently spoils the somewhat soft disk.

German patent document 2,917,042 filed Apr. 27, 1979 by Gunther Schauffeld (citing U.S. Pat. Nos. 4,124,352 and 3,830,613) describes a system where a punch physically knocks a molded workpiece out of a mold. Such an arrangement is fairly crude and, indeed, this patent document does not deal with a delicate optical disk but with a more rugged workpiece.

In German patent document 3,027,568 filed by Egbert Broeksoma et al with a claim to a Dutch priority date of Aug. 10, 1979 an arrangement is described whereby grippers engage the edges of an optical disk and peel it off one of the mold parts after it has cured somewhat. This arrangement deforms the disk considerably and can, therefore, damage it.

PCT publication WO 88/01564 (citing U.S. Pat. Nos. 4,519,767, 4,283,973, and 4,441,949) also grips the edges of the disks as they are being processed, but does not describe how the disks are stripped from the mold they are originally produced in.

Finally, European patent application publication 339,616 injects air between the disk and the mold part it is stuck to to free it therefrom. This procedure is relatively gentle, but still does substantially deform the disk so that it can be damaged, especially as it is still fairly hot and plastically deformable when it is being separated from the mold.

OBJECTS OF THE INVENTION

It is therefore an object of the present invention to provide an improved method of and system for molding an optical disk.

Another object is the provision of such an improved method of and system for molding an optical disk which overcomes the above-given disadvantages, that is which allows the disk to be stripped from its mold without substantially deforming it or touching either of its faces.

SUMMARY OF THE INVENTION

A method of making an optical disk having a pair of axially oppositely directed faces and an annular outer periphery according to the invention comprises the step of first forming a mold cavity corresponding to the shape of the disk between a pair of axially spaced parts and a demolding ring sandwiched between the parts. The cavity is then filled with a hardenable resin such that the parts form the respective faces and an inner periphery of the ring forms the outer periphery of the disk and the resin is at least partially hardened in the cavity. The parts are then axially oppositely separated from each other and from the disk to leave the disk in the ring with both of its faces exposed and the ring is then transversely displaced with the disk engaged in it out from between the mold parts. The disk is then cooled and shrunk such that its outer periphery separates from the inner periphery of the ring and the disk separates from the ring.

With this system therefore there is no need to make any physical contact whatsoever with either of the faces of the disk. The ring gripping the edge holds it solidly enough to allow the two mold parts to peel away from the disk faces, and once the disk cools and shrinks slightly, it separates sufficiently from the ring to drop out, without being touched on its delicate faces.

According to another feature of this invention during an after during the curing and cooling step another such ring is aligned between the parts and same are closed on it to form the cavity. Then the remaining steps of the method are sequentially repeated with the other such ring to make another disk, all while the first one is cooling. Clearly there can be a plurality of such second rings to allow plenty of time for the cooling/shrinking step. The rings outside the mold can be axially aligned with one another or can all lie in the same plane, being carried on a common drum-like support.

The apparatus according to this invention therefore has a pair of axially spaced and axially relatively displaceable mold parts and a ring axially alignable between the parts and having an inner periphery forming with the parts a substantially closed mold cavity corresponding to the shape of the disk. Means is provided for axially oppositely separating the parts from each other and from the disk to leave the disk in the ring with both of its faces exposed after at least partial hardening of the resin in the cavity and for transversely displacing the ring with the disk engaged in it out from between the mold parts.

Furthermore according to this invention the inner periphery of the ring can be radially inwardly concave or convex. The ring can also be provided with at least one latching element radially displaceable between an inner position projecting radially inward past the inner periphery and an outer position not projecting radially inward past the inner periphery.

BRIEF DESCRIPTION OF THE DRAWING

The above and other objects, features, and advantages will become more readily apparent from the following, it being understood that any feature described with reference to one embodiment of the invention can be used where possible with any other embodiment and that reference numerals or letters not specifically mentioned with reference to one figure but identical to those of another refer to structure that is functionally if not structurally identical. In the accompanying drawing.

SPECIFIC DESCRIPTION

Figure 1:
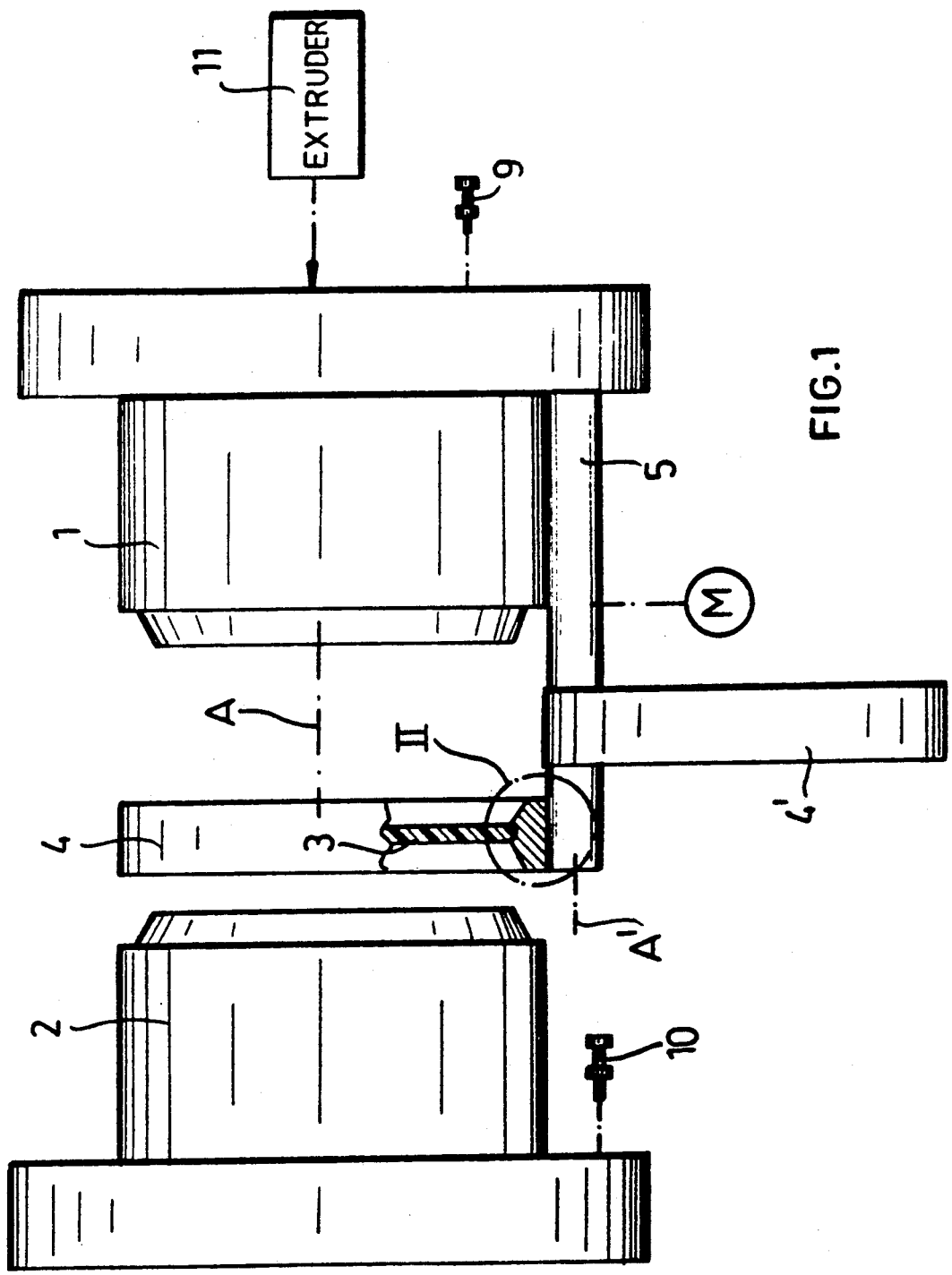
FIG. 1 is a partly sectional side view of the system of this invention.
Figure 2:
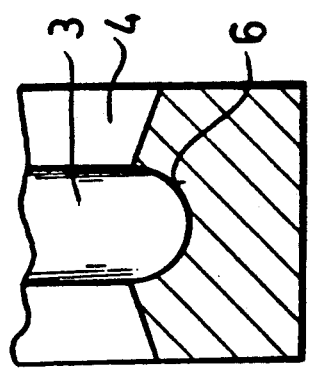
FIG. 2 is a large-scale view of the detail indicated at II in FIG. 1.

As seen in FIGS. 1 and 2 a pair of mold parts 1 and 2 aligned along an axis A can be moved toward and away from each other axially by respective actuators shown schematically at 9 and 10. An extruder shown schematically at 11 can feed a liquefied synthetic resin to the part 1.

According to the invention a mold ring 4 is held on a support 5 between the two mold parts 1. The two parts 1 and 2 can be closed axially on the ring 4 to form therewith a mold cavity having one axial side delimited by the part 1, an opposite axial side delimited by the part 2, and an outer periphery delimited by an inwardly concave periphery 6 of the ring 4. The extruder II can fill this cavity with the resin to form a workpiece disk 3, here an optical disk carrying information in the form of surface irregularities imparted by the face of the part 1 and/or 2.

Once the disk 3 thus formed has hardened sufficiently to maintain its shape at ambient temperature, the two parts 1 and 2 are axially separated from each other, leaving the disk 3 in the ring 4 with both faces of the disk 3 separated from the respective mold parts 1 and 2. Then the support 5 swings the ring 4 out about an axis A' parallel to the axis A and simultaneously swings another such ring 4' into position between the parts I and 2. The parts 1 and 2 can then be closed on the new ring 4' while the disk 3 in the ring 4 cools and another disk can be molded.

The depth of the inwardly open groove forming the inner periphery 6 is very slight so that, as the disk 3 cools and shrinks, it pulls away from this periphery 6, freeing the disk 3 from the ring 4. The cured and cool disk will drop easily from the ring 4 so that the process can be repeated.

Figure 5:
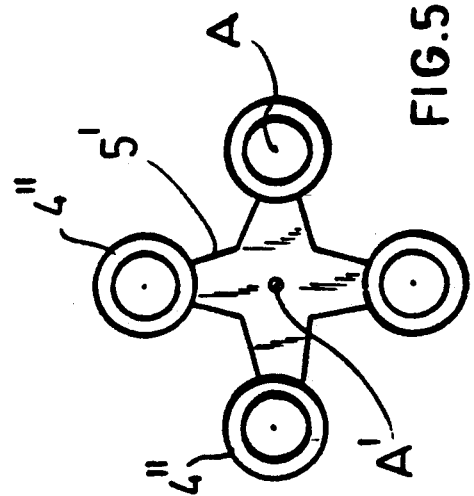
FIG. 5 is a small-scale diagrammatic view of an alternative arrangement according to the invention.

It is of course possible to provide more than two such rings 4, 4' which are axially aligned with one another when not in the mold. Alternately as shown in FIG. 5 a holder 5' can carry a plurality of rings 4'' identical to the ring 4 which are stepped angularly about the axis A', so that at any time one ring 4'' is in the mold and the remaining ones are outside it but in the same plane perpendicular to the axes A and A'.

Figure 3:
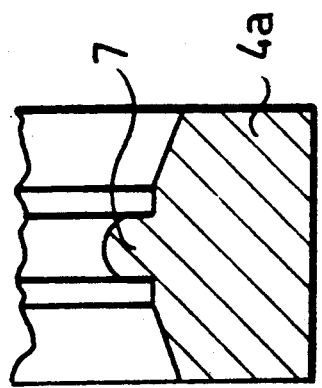

Furthermore as seen in FIG. 3 a ring 4a can be used having an inner periphery 7 that is radially inwardly convex, not concave. This formation will produce a disk whose outer edge is outwardly concave, opposite to the shape of the disk 3 produced by the ring 4.

Figure 4:
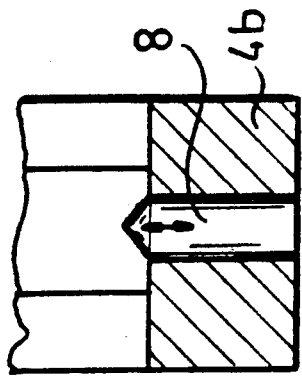
FIGS. 3 and 4 are views like FIG. 2 of variants on the apparatus of this invention.

FIG. 4 shows ring 4b with a radially inwardly projecting latch pin or element 8 that can be moved radially outward as indicated by the arrow to free a disk held in the ring 4b. This system is useful the of the extra if shrinage resin is small and hold is necessary.

We claim:

1. A method of making an optical disk having a pair of axially oppositely directed faces and an annular outer periphery, the method comprising the steps of sequentially:
    a) forming a mold cavity corresponding to the shape of the disk between a pair of axially spaced parts and a demolding ring sandwiched between the parts;
    b) filling the cavity with a hardenable resin that shrinks when cooled, whereby the parts form the respective faces and an inner periphery of the ring forms the outer periphery of the disk;
    c) at least partially hardening the resin in the cavity;
    d) axially oppositely separating the parts from each other and from the disk and leaving the disk in the ring with both of the disk faces exposed;
    e) transversely displacing the ring with the disk engaged in the ring out from between the mold parts; and
    f) cooling and shrinking the disk such that its outer periphery separates from the inner periphery of the ring and the disk separates from the ring.

2. The disk-making method defined in claim 1 further comprising during and after during step f) the steps of
    g) aligning another such ring-between the parts and closing same on it to form the cavity, and
    h) repeating steps b), c), d), e), and f) sequentially with the other such ring.

* * * * *